United States Patent
Shimizu

(10) Patent No.: US 11,558,524 B2
(45) Date of Patent: Jan. 17, 2023

(54) PRINTING DEVICE

(71) Applicant: CASIO COMPUTER CO., LTD., Tokyo (JP)

(72) Inventor: Daisuke Shimizu, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/837,978

(22) Filed: Jun. 10, 2022

(65) Prior Publication Data

US 2022/0303419 A1 Sep. 22, 2022

Related U.S. Application Data

(63) Continuation of application No. 17/374,296, filed on Jul. 13, 2021, now Pat. No. 11,381,699.

(30) Foreign Application Priority Data

Jul. 14, 2020 (JP) .............................. JP2020-120316

(51) Int. Cl.
*H04N 1/00* (2006.01)

(52) U.S. Cl.
CPC ....... *H04N 1/00827* (2013.01); *H04N 1/0044* (2013.01); *H04N 1/00251* (2013.01); *H04N 1/00488* (2013.01); *H04N 2201/0081* (2013.01); *H04N 2201/0089* (2013.01)

(58) Field of Classification Search
CPC ........... H04N 1/00827; H04N 1/00251; H04N 1/0044; H04N 1/00488; H04N 2201/0081; H04N 2201/0089
See application file for complete search history.

(56) References Cited

U.S. PATENT DOCUMENTS

| | | | |
|---|---|---|---|
| 6,286,517 B1 * | 9/2001 | Weber | B41J 3/4073 132/73 |
| 9,712,727 B2 | 7/2017 | Yamasaki | |
| 10,278,472 B2 * | 5/2019 | Yamasaki | A45D 29/00 |
| 10,292,475 B2 * | 5/2019 | Yamasaki | G06K 15/021 |
| 10,404,890 B2 * | 9/2019 | Cao | A45D 44/005 |
| 10,561,219 B2 * | 2/2020 | Hori | B41J 11/58 |

(Continued)

FOREIGN PATENT DOCUMENTS

JP 2003-534083 A 11/2003
JP 2016-123475 A 7/2016
(Continued)

OTHER PUBLICATIONS

JPO; Application No. 2020-120316; Notice of Reasons for Refusal dated Jul. 5, 2022.

*Primary Examiner* — Ted W Barnes
(74) *Attorney, Agent, or Firm* — Fitch, Even, Tabin & Flannery LLP

(57) ABSTRACT

Disclosed is a printing device including: a finger stage which has a nail rest, having an identifier, to place a tip of a nail, the nail being a printing target, and on which a finger corresponding to the nail is placed; and at least one camera which obtains an image from a first direction and an image from a second direction. The identifier which detects a position of the nail is provided on one surface of the nail rest such that the identifier does not exist in the image from the first direction but the identifier exists in the image from the second direction.

6 Claims, 4 Drawing Sheets

(56) References Cited

U.S. PATENT DOCUMENTS

| | | | |
|---|---|---|---|
| 10,653,225 B2* | 5/2020 | Walia | H04N 1/00188 |
| 10,736,400 B2* | 8/2020 | Nagao | B41J 19/207 |
| 10,750,838 B2* | 8/2020 | Leong | H04N 1/00238 |
| 10,806,231 B2* | 10/2020 | Sato | A45D 29/004 |
| 10,939,739 B2* | 3/2021 | Mor Yosef | A45D 34/04 |
| 11,265,444 B2* | 3/2022 | Walia | H04N 1/00188 |
| 2016/0088197 A1* | 3/2016 | Yamasaki | H04N 5/225 |
| | | | 348/142 |
| 2017/0367459 A1* | 12/2017 | Yamasaki | A45D 34/04 |
| 2018/0084889 A1* | 3/2018 | Hori | G06K 15/22 |
| 2020/0207080 A1* | 7/2020 | Hayashi | A45D 29/00 |
| 2021/0271940 A1* | 9/2021 | Yamasaki | B41J 2/1752 |
| 2022/0087394 A1* | 3/2022 | Osakabe | G06T 7/73 |

FOREIGN PATENT DOCUMENTS

| | | | | |
|---|---|---|---|---|
| JP | 2016123475 A | * | 7/2016 | |
| JP | 2019-097721 A | | 6/2019 | |
| JP | 2020-103448 A | | 7/2020 | |
| JP | 2020103448 A | * | 7/2020 | A45D 29/00 |
| WO | 01/91598 A1 | | 12/2001 | |
| WO | WO-2015166104 A1 | * | 11/2015 | B41J 3/407 |
| WO | 2020/110351 A1 | | 6/2020 | |
| WO | WO-2020110351 A1 | * | 6/2020 | A45D 29/00 |

* cited by examiner

PRINTING DEVICE

CROSS-REFERENCE TO RELATED APPLICATIONS

This application is a continuation of prior U.S. application Ser. No. 17/374,296, filed on Jul. 13, 2021, which claims the benefit of priority from the prior Japanese Patent Application No. 2020-120316, filed on Jul. 14, 2020, the entire contents of which are incorporated herein by reference.

BACKGROUND

Technical Field

The present disclosure relates to a printing device.

Background Art

Conventionally, there are known printing devices (nail printing devices) that print nail designs on fingernails, toenails and the like.

For example, JP 2003-534083 A discloses a printing device that print nail designs on the nails by an inkjet method.

It is possible to easily enjoy nails by performing nail printing with the printing device.

SUMMARY

According to an aspect of the present disclosure, there is provided a printing device including: a finger stage which has a nail rest, having an identifier, to place a tip of a nail, the nail being a printing target, and on which a finger corresponding to the nail is placed; and at least one camera which obtains an image from a first direction and an image from a second direction, wherein the identifier which detects a position of the nail is provided on one surface of the nail rest such that the identifier does not exist in the image from the first direction but the identifier exists in the image from the second direction.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DESCRIPTION OF EMBODIMENTS

An embodiment of a printing device according to the present disclosure will be described with reference to FIGS. 1 to 4.

The embodiment described below is provided with various limitations technically preferable for carrying out the present disclosure. However, the scope of the present disclosure is not limited to the embodiment below or illustrated examples.

Furthermore, in the following embodiment, a case where the printing device is a printing device that performs printing on fingernail(s) (including thumbnail(s)) of hand(s) as a printing target will be described as an example. However, the printing target of the printing device in the present disclosure is not limited to the fingernail(s) or the thumbnail(s) of hand(s). For example, toenail(s) of foot (feet) may be the printing target.

Figure 1:
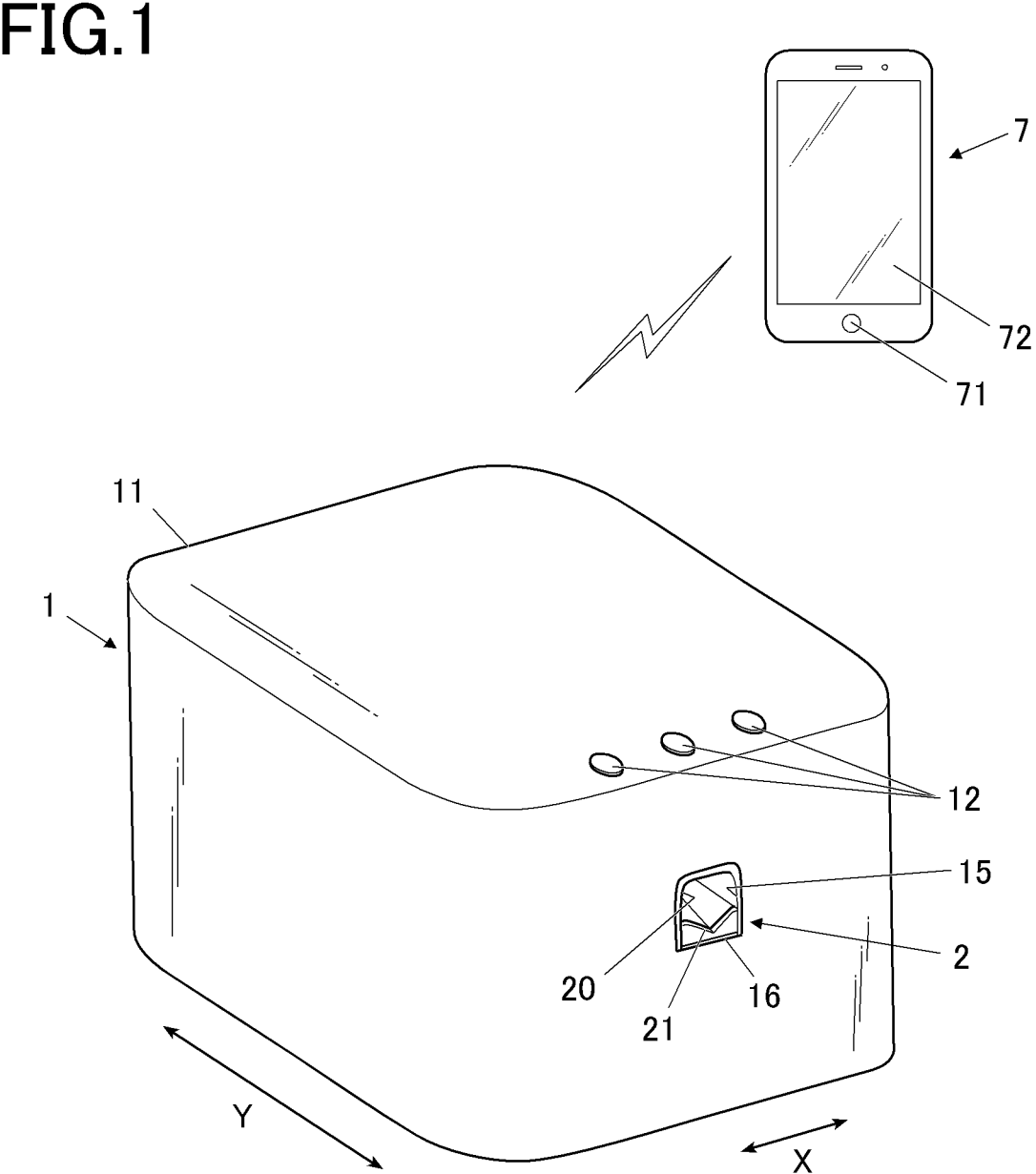
FIG. 1 is a perspective view showing schematic configurations of a printing device and a terminal device that cooperates with the printing device in an embodiment.

FIG. 1 is a perspective view showing the outer appearance of the printing device and a terminal device that cooperates with the printing device in the embodiment. The embodiment takes, as an example, a case where the printing device 1 performs printing on the nail T in cooperation with the terminal device 7.

The terminal device 7 is a portable terminal device such as a smartphone, for example. The terminal device 7 is not limited to the smartphone. For example, the terminal device 7 may be a tablet type personal computer (hereinafter, referred to as a PC), a notebook PC, a stationary PC, a terminal device for a game, or the like.

As shown in FIG. 1, the terminal device 7 in the present embodiment includes an operation unit 71, a display 72, a communication unit (not shown in the drawings) that performs data transmission and reception with the printing device, a control device (not shown in the drawings), and the like.

The operation unit 71 includes various types of operation buttons, for example. The operation unit 71 can perform various inputs and settings according to user operations. When the operation unit 71 is operated, an input signal corresponding to the operation is transmitted to the control device. In the present embodiment, a touch panel is integrally provided on the surface of the display 72, and the user can perform various input/setting operations and the like by touch operations on the touch panel.

The operation unit 71 for performing various input/setting operations and the like is not limited to the operation button or touch panel. For example, a keyboard, a pointing device, and the like may be provided as the operation unit 71.

In the present embodiment, the terminal device 7 outputs various types of instructions such as an instruction to start printing to the printing device 1 by the user operating the operation unit 71. Thus, the terminal device 7 also functions as an operation unit of the printing device 1.

The user can select a nail design to be printed on the nail T by operating the operation unit 71.

The display 72 is configured by including an LCD (Liquid Crystal Display), an organic electroluminescence display, other flat displays or the like, for example.

As mentioned above, the touch panel for performing various types of input may be integrally configured on the surface of the display 72. In this case, the touch panel functions as the operation unit 71.

In the present embodiment, the display 72 can display the nail design which was input and selected via the operation unit 71 by the user, various types of guide screens, warning display screens, and the like.

In the present embodiment, the display 72 displays an image of the nail T of the finger U photographed by a photographing unit 5 of the printing device 1 (image of the finger U including the nail T, hereinafter, referred to as a "nail image"). In the present embodiment, the photographing unit 5 can obtain an upper image P1 obtained by photographing the upper surface of the nail T and a lateral image P2 obtained by photographing the lateral surface of the nail T. The "nail image" displayed on the display 72 includes the upper image P1 and the lateral image P2. The display 72 displays a nail image display screen 72a (see FIG. 4) to display these nail images.

The display 72 may display not only a still image but also a moving image such as a live view image.

The printing device 1 in the present embodiment includes a housing 11 which is formed in a nearly box shape, a photographing unit 5 which is contained inside the housing 11, a finger stage 2, and the like. Though not shown in the drawings, the printing device 1 includes a printing unit that performs printing on a printing target (nail T of the finger U in the present embodiment), a communication unit that communicates with the terminal device 7 and the like, a control device that controls the components of the printing device 1, and the like, in addition to the above units.

As shown in FIG. 1, an operation unit 12 is set on the upper surface (top plate) of the housing 11.

The operation unit 12 is for the user to perform various types of input.

In the operation unit 12, there are arranged operation buttons for performing various types of input such as a power switch button to turn on the printing device 1, a stop switch button to stop the operation, and a printing start button to instruct to start printing.

When the operation unit 12 is operated, an operation signal is output to a control device not shown in the drawings, and the control device performs control according to the operation signal, to operate the components of the printing device 1.

The components in the printing device 1 may be operated in accordance with the operation signal input from the operation unit 71 of the terminal device 7 instead of the operation unit 12.

The photographing unit 5 is provided on the inner side of the upper surface (top plate) of the housing 11.

The photographing unit 5 includes a photographing device and an illuminating device not shown in the drawings. The photographing unit 5 is mounted on the substrate 53 and attached inside the housing 11 (see FIG. 2).

The photographing device is, for example, a small-sized camera configured by including a solid imaging element which has approximately two million pixels or more and a lens. The illuminating device is an illuminating lamp of a white LED, for example.

The photographing unit 5 illuminates the nail T of the finger U held by an after-mentioned finger stage 2 with the illuminating device. The photographing unit 5 photographs the finger U with the photographing device, and obtains the nail image (image of the finger U including the nail T) that is an image of the nail T of the finger U. The photographing unit 5 is a photographing unit that obtains an image of the nail T of the finger U held by the finger stage 2.

The photographing unit 5 may be provided at any position capable of photographing the finger U held by the finger stage 2, and the specific arrangement is not particularly limited. In the present embodiment, the photographing unit 5 is arranged to be fixed at a position on the inner side of the top surface of the housing 11 capable of facing the nail T (surface of the nail T) of the finger U held by the finger stage 2. In this case, it is preferable that the photographing unit 5 is at a position not capable of directly photographing an after-mentioned identifier 27.

The photographing unit 5 may be configured to be movable in the X-Y direction by various types of moving mechanisms.

As mentioned later, the photographing unit 5 can obtain an image from a lateral direction (second direction) of the nail T placed on an after-mentioned nail rest 25 (referred to as "lateral image P2").

The photographing unit 5 in the present embodiment is provided at a position capable of facing the nail T (surface of nail T) of the finger U held by the finger stage 2 on the inner side of the top surface of the housing 11 as mentioned above. Thus, the photographing unit 5 can obtain an image (referred to as "upper image P1") from an upper direction (first direction) of the nail T placed on the nail rest 25. As mentioned later, the printing device 1 in the present embodiment includes an optical element (a mirror 18 in the present embodiment) that can locate the images from upper and lateral directions of the nail T of the finger U held by the finger stage 2 within the photographing possible range of the photographing unit 5. Thus, the photographing unit 5 can also obtain the image (lateral image P2) from the lateral direction of the nail T via the optical element (mirror 18 in the present embodiment). The photographing unit 5 may be provided on the lateral side of the printing device 1, for example. In this case, the photographing unit 5 may directly obtain the image (lateral image P2) from the lateral direction of nail T, and may obtain the image (upper image P1) from the upper direction of the nail T via the optical element (mirror 18 in the present embodiment).

The photographing unit 5 may photograph a still image or may be capable of photographing a moving image that can be displayed in a live view on the display 72 of the terminal device 7 or the like.

The nail image obtained by the photographing unit 5 is transmitted to the terminal device 7 via a communication unit not shown in the drawings.

The image data of the image photographed by the photographing unit 5 may be obtained by the control device or the like of the printing device 1 and stored in a storage that is provided inside or outside the printing device 1.

A finger inserting port 15 that is an opening to insert the finger at the time of printing by the printing device 1 is formed on the front surface side (front side in the Y direction in FIG. 1) of the housing 11 of the printing device 1.

A finger stage 2 to place and hold the inserted finger U during printing is formed inside the finger inserting port 15. The finger stage 2 holds the finger U corresponding to the nail T that is the printing target.

The inside of the housing 11 is vertically divided by a dividing plate 16, and the finger stage 2 is provided at a position corresponding to the finger inserting port 15 on the dividing plate 16 (in the present embodiment, nearly central portion in the horizontal direction of the printing device 1 (X direction in FIGS. 1 and 3)).

Figure 2:
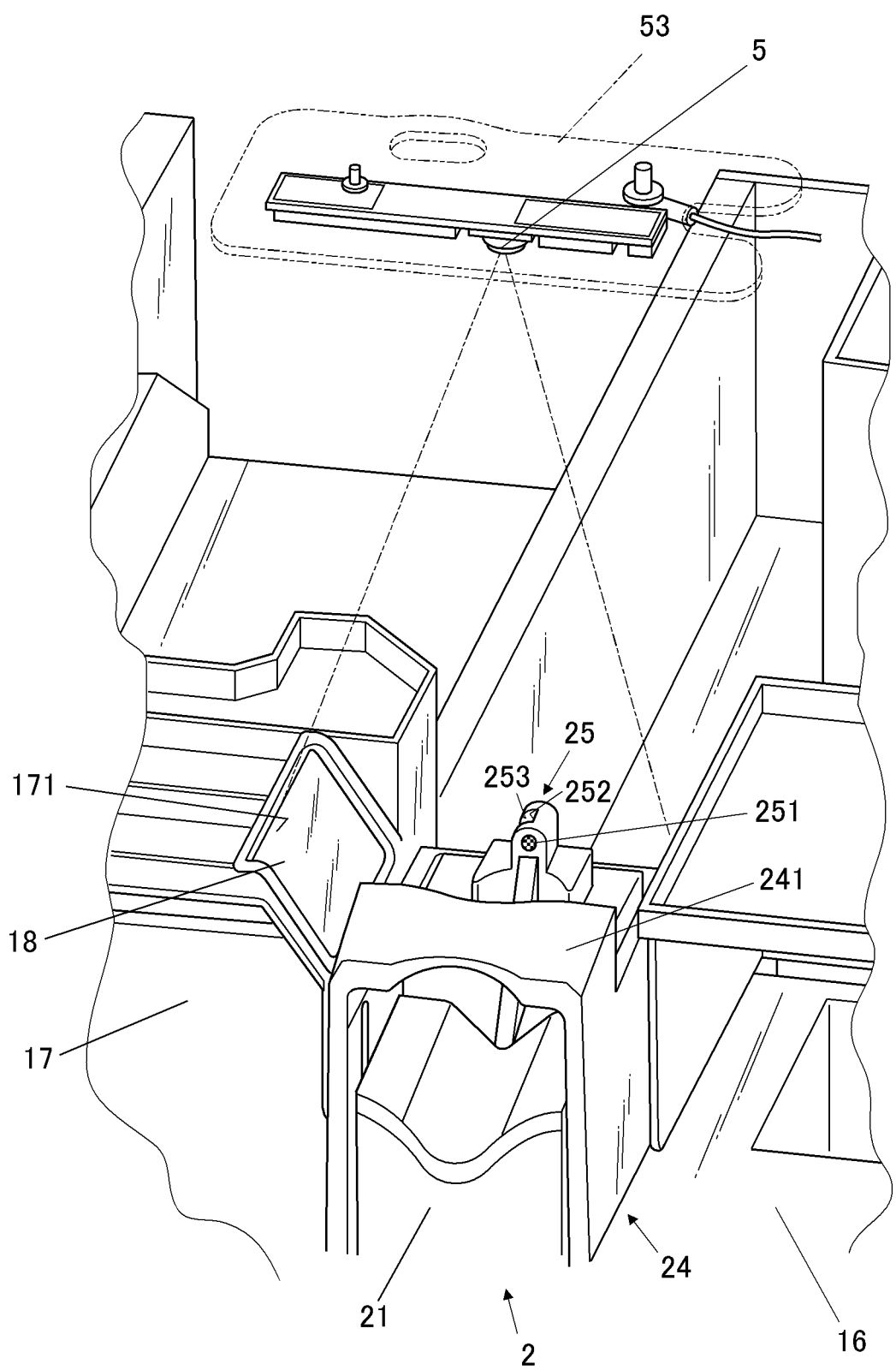
FIG. 2 is a main part perspective view showing a main part configuration of a finger stage and its surrounding portion provided in the printing device in the embodiment.
Figure 3:
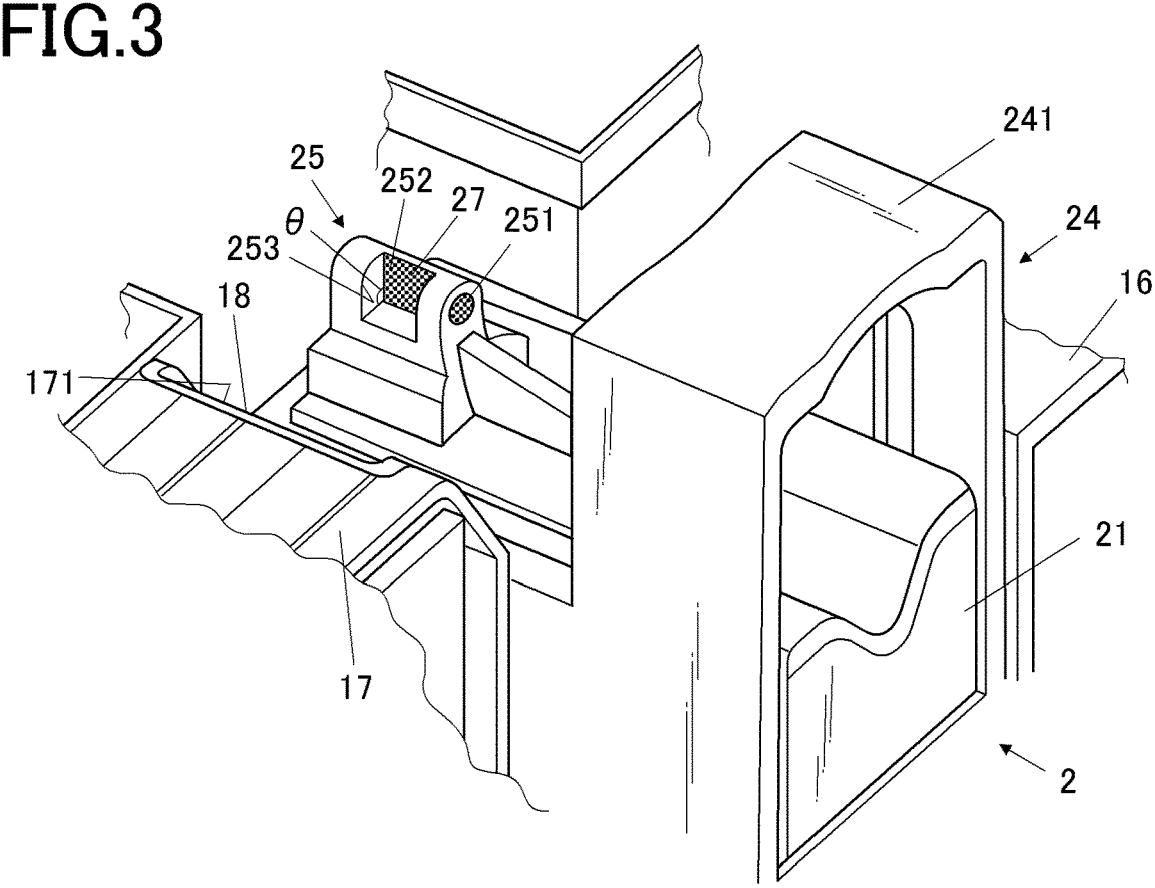
FIG. 3 is a main part perspective view of the finger stage and its surrounding portion seen from upper left.

FIG. 2 is a perspective view showing the main part configuration of the finger stage 2 and its surrounding portion inside the housing 11. FIG. 3 is a main part perspective view of the finger stage 2 and its surrounding portion seen from upper left of the printing device 1 (left side in the X direction in FIG. 1).

As shown in FIGS. 2 and 3, a finger supporting member 21 that receives the belly of the held finger U is provided on the lower side of the finger stage 2.

The finger supporting member 21 presses the finger U from the lower side to support the finger U, and is formed of a flexible resin, for example. The configuration of the finger supporting member 21 is not particularly limited as long as the finger supporting member 21 can support the finger U from the lower side. For example, the finger supporting member 21 may be biased from the lower side by an elastic member such as a spring. For example, the finger supporting member 21 may be configured to be able to swell and shrink by changing the internal pressure so that the finger supporting member 21 presses up the finger U in the swelling state and fixes the position. For example, the finger supporting member 21 may not be vertically movable as long as the finger U can be placed thereon. In this case, the finger supporting member 21 may not be an independent member as the finger supporting member 21, but may be integrated with other members in the finger stage.

The front side of the finger stage 2 (front side in the Y direction in FIG. 1) is surrounded by a frame portion 24. The top surface of the frame portion 24 is a finger presser 241 that abuts the upper side of the finger U held by the finger stage 2 and regulates the upward position of the finger U.

The back side of the finger stage 2 (back side in the Y direction in FIG. 1) is open on the upper side, to expose the surface of the nail T of the finger U inserted into the finger stage 2.

The finger stage 2 includes a nail rest 25 to place the tip of the nail T. To be specific, the nail rest 25 on which the tip of the nail T of the finger U is placed is provided on the back side in the finger inserting direction inside the finger stage 2 in the present embodiment. The nail rest 25 in the present embodiment is a protruding part that extends along the inserting direction of the finger U and bulges in a semi-cylindrical shape. The shape and arrangement of the nail rest 25 are not limited to the illustrated example as long as the tip of the nail T can be placed on the nail rest 25.

The finger U and its nail T are supported by the finger supporting member 21 from the lower side in a state in which the tip of the nail T is placed on the nail rest 25, the upper side of the finger U is pressed by the finger presser 241, and thereby the finger U and its nail T are positioned at a predetermined position. The finger presser 241 is not an essential configuration as long as the tip of the nail T can be placed on the nail rest 25.

In the present embodiment, a target mark 251 that is an index of the abutting position of the fingertip is provided on an end surface on the front side of the nail rest 25. The target mark 251 is a goal when the user inserts the finger U into the finger stage 2, and its shape and the like are not particularly limited. In the present embodiment, for example, a circle of a red color or the like is provided as the target mark 251. The target mark 251 may be applied by printing, or a seal or the like may be attached. The target mark 251 may be obtained by attaching a reflection plate that reflects light, may be a mark drawn by a fluorescent ink, or the like, so as to be easily identified on the image. The target mark 251 may not necessarily appear in the images, and may be a convex or a concave that can be felt when it is touched by the fingertip, for example.

The target mark 251 appears in the upper image P1 (see FIG. 4) photographed from the upper side of the finger stage 2. When the finger U is inserted to the correct position back in the finger stage 2, the target mark 251 is covered with the finger U and does not appear in the image. Thus, when the user inserts the finger U while seeing the image, the user can confirm how much degree the finger U is inserted by confirming how the target mark 251 is seen (hidden degree of the target mark 251 by the finger U).

In the present embodiment, an identifier 27 of the position of the nail T is provided on the lateral surface side of the nail rest 25. The identifier 27 can be distinguished from the nail T and the components of the finger stage 2, and is a reference of the position of the nail T.

As mentioned later, the identifier 27 is provided at such a position that the identifier 27 is on the lateral surface of the nail rest 25 and thus does not appear in the upper image P1 (see FIG. 4) (identifier 27 does not exist in P1), but appears in the lateral image P2 (see FIG. 4) (identifier 27 exists in P2). In the present embodiment, the identifier 27 is provided on the lateral surface of the nail rest 25. However, the identifier 27 may be provided on one surface of the nail rest 25, and the position to provide the identifier 27 is not limited to the lateral surface of the nail rest 25. The identifier 27 may be provided on the back surface of the nail rest 25.

In the present embodiment, as mentioned above, the nail rest 25 is a semi-cylindrical protrusion. The nail rest 25 includes a cutout portion 253 that has a wall surface 252 that is a flat plane nearly orthogonal to an XY plane (horizontal plane) from the nearly central portion to the left or right side (left side in X direction in the illustrated example) in the width direction (device width direction X in FIG. 1) of the nail rest 25. The identifier 27 is formed by applying paint of a red color or the like to this wall surface 252. The method of applying the identifier 27 is not particularly limited. The identifier 27 may be formed by attaching a seal, as well as various types of printing, painting and vapor deposition.

By forming the identifier 27 on the wall surface 252 that is nearly orthogonal to the XY plane in such a way, the cutout portion 253 appears but the identifier 27 formed on the wall surface 252 does not appear in the upper image P1 obtained by photographing the upper surface of the nail rest 25. The identifier 27 formed on the wall surface 252 appears together with the cutout portion 253 in the lateral image P2 obtained by photographing the lateral surface of the nail rest 25 (see FIG. 4 described later). In the present embodiment, by providing such an identifier 27 to the nail rest 25, it is possible to detect the position in the height direction of the nail T. Thus, the identifier 27 is a reference of the position in the height direction of the nail T. In addition, the identifier 27 may be used as a reference of the position in the depth direction of the nail T by providing a scale or the like indicating the position in the depth direction (finger inserting direction) on the identifier 27, for example.

The wall surface 252 to form the identifier 27 is not limited to the wall surface which is nearly orthogonal to the XY plane (horizontal plane), as long as the identifier 27 appears in the lateral image P2 and does not appear in the upper image P1. For example, the wall surface 252 may be at an angle θ smaller than 90 degrees with respect to the bottom surface of the cutout portion 253 (that is, horizontal surface). In this case, it is possible to more surely prevent the identifier 27 from appearing in the upper image P1. Thus, it is possible to more accurately recognize the nail T.

A supporting table 17 having the inclined surface 171 at a predetermined angle is provided on the lateral side of the finger stage 2 where the cutout portion 253 is provided (left side of the finger stage 2 in the X direction in the illustrated example). A mirror 18 is attached to the inclined surface 171.

The side where the cutout portion 253 is provided is not limited to the illustrated example. In a case where the cutout portion 253 is provided on the right side of the finger stage 2 in the X direction, the supporting table 17 and the mirror 18 are arranged on the right side of the finger stage 2 in the X direction.

The shape and the like of the supporting table 17 are not limited to the illustrated example.

The mirror 18 is an optical element that enables the photographing unit 5 as a photographing unit to obtain the images from the upper and lateral directions (that is, upper image P1 and lateral image P2) of the nail T of the finger U held by the finger stage 2. That is, the photographing unit 5 in the present embodiment is provided above the finger stage 2, and the upper surface of the nail T can be within the photographing possible range of the photographing unit 5. By providing the mirror 18, it is possible to locate the lateral surface of the nail T of the finger U held by the finger stage 2 within the photographing possible range of the photographing unit 5 via the mirror 18. In a case where the photographing unit 5 is provided lateral to the finger stage 2, the mirror is arranged at a position that can locate the upper surface of nail T within the photographing possible range of the photographing unit 5.

In the example of the present embodiment, a rectangular mirror 18 is provided as shown in FIG. 2.

The predetermined angle of the inclined surface 171 is appropriately adjusted according to the attaching position of the mirror 18, the positions, angles and the like of the nail rest 25 and the nail T having the tip placed on the nail rest 25. By adjusting the inclined surface 171 to be at an appropriate inclination angle, it is possible to obtain the lateral image P2 of the nail T via the mirror 18 which is the optical element, with the above-mentioned photographing unit 5.

As the mirror 18, a mirror made of a synthetic resin using acrylic for the base material is used, for example. The material of the mirror 18 is not particularly limited, and the mirror 18 may be a glass mirror using a glass for the base material, for example. The mirror 18 is not limited to a plate mirror, and the mirror 18 may be formed by bonding a mirror formed in a sheet onto the inclined surface 171.

The printing device 1 is dark inside the housing 11. The finger stage 2 (nail rest 25 and its surrounding portion) is especially formed in black or the like that is easily discriminated from the nail T and the skin of finger U, so that the region of nail T is easily identified from the nail image (upper image P1) obtained by photographing the nail T from the upper side.

Thus, when the nail rest 25 is photographed from the lateral side, the nail rest 25 disappears into the background, and it is not possible to correctly recognize the height position of the nail rest 25. In this case, though the nail T and the finger U placed on the nail rest 25 appear in the blackish background in a state in which the nail T and the finger U are easily identified, the reference of the height position of the nail T such as the position of the upper end surface of the nail rest 25 is not clear, for example. Thus, even when the lateral image P2 obtained by photographing the nail rest 25 from the lateral side (lateral direction), it is not possible to confirm whether or not the nail T is arranged at an appropriate position (especially, position in the height direction).

On this respect, in the present embodiment, the identifier 27 that can be distinguished from the nail T and the components of the finger stage 2 and that serves as the reference of the position in the height direction of the nail T is provided in the nail rest 25. The identifier 27 serves as the reference of the height position of the nail T when image processing such as image analysis and image recognition is performed to the obtained image. Thus, it is preferable that the identifier 27 is formed by applying a color that is easily distinguished from the nail T and the components of the finger stage 2. Thus, the preferable color of the identifier 27 is a color which is a pale blue or the like that is the complementary color (opposite color) of the flesh color as the color of nail T or finger U, for example, and which has a large difference from the black color used in the finger stage 2 and the like, in addition to the red color of the above-mentioned example. A bright pale blue or the like is preferably used. The color of the identifier 27 is not limited to the color described above. An appropriate color is adopted as needed according to the degree of brightness inside the housing 11 of the printing device 1, the colors of the members, and the like. The color of the identifier 27 may be a fluorescent color, for example.

The action of the printing device of the preset embodiment will be described.

When nail printing is performed by using the printing device 1 of the present embodiment, the user turns on the printing device 1 to activate the printing device 1. The user also turns on the terminal device 7 and selects execution of nail print processing from the operation unit 71 of the terminal device 7. Thus, an application program (not shown in the drawings) for performing nail printing is activated.

The user selects a nail design to be printed on the nail T, and inserts the finger U corresponding to the nail T to perform printing into the finger stage 2.

It is preferable that how the finger U is inserted into the finger stage 2 is photographed by the photographing unit 5 as necessary, transmitted to the terminal device 7 and displayed as a live view image on the display 72. Thereby, the user can confirm the arrangement state of the finger U in real time by watching the display 72.

When the user inserts the finger U into the finger stage 2 to a position of covering the target mark 251 and places the nail tip on the nail rest 25, the photographing unit 5 photographs the finger U set in the finger stage 2, to obtain nail images. The obtained nail images are transmitted to the terminal device 7 via the communication unit, and displayed on the display 72 of the terminal device 7 as needed.

Figure 4:
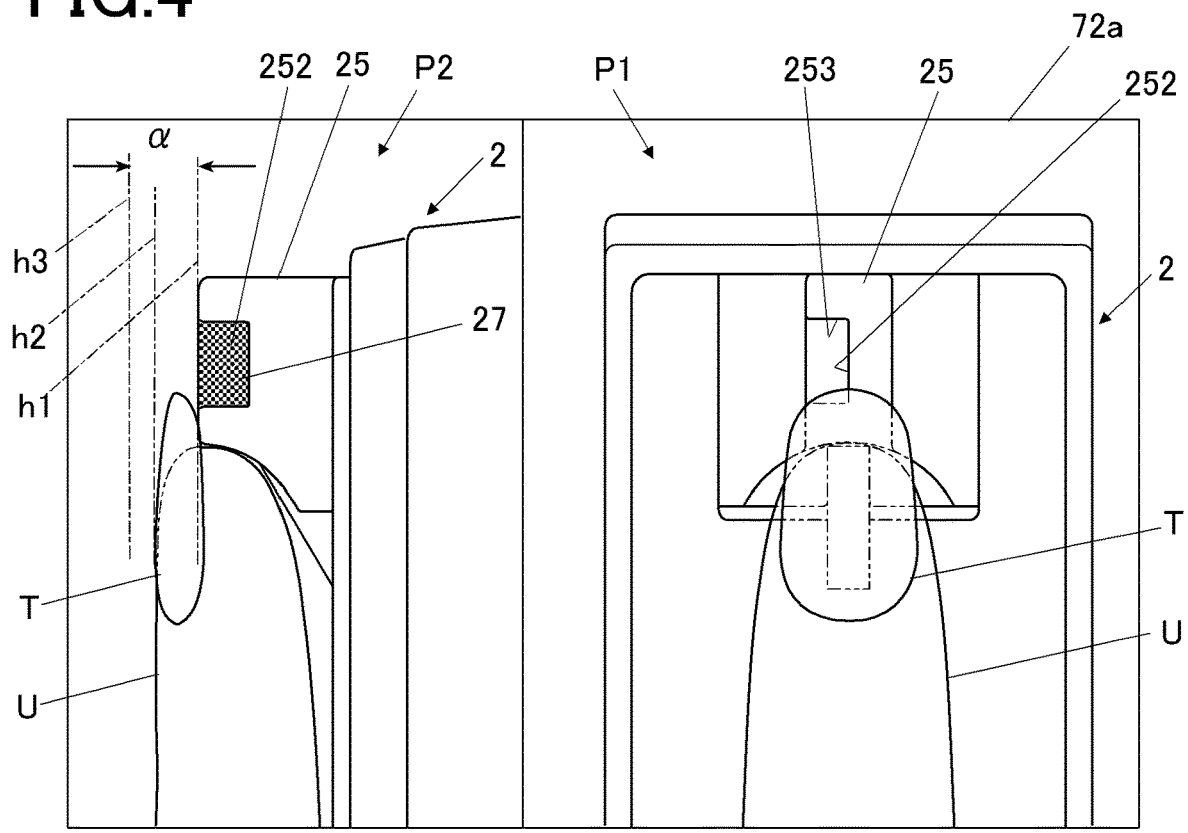
FIG. 4 is a view showing an example of a nail image display screen that is displayed on a display.

FIG. 4 is a view showing an example of a nail image display screen displayed on the display.

FIG. 4 shows an example of displaying the upper image P1 and the lateral image P2 side by side in a single screen as the nail image display screen 72a.

In the upper image P1 shown on the right side of FIG. 4, the finger U that includes the nail T having the nail tip placed on the nail rest 25 and the upper surface of the finger stage 2 appear, and the cutout portion 253 of the nail rest 25 also appears. However, the identifier 27 provided on the wall surface 252 does not appear.

The upper image P1 is used for detecting the region of nail T (outline of nail T) by performing image analysis and image processing of the upper image P1. It is difficult to accurately detect the region of nail T (outline of nail T) when the identifier 27 in a color (for example, red or pale blue) different from the color (for example, black) inside the finger stage 2 appears in the image. On this respect, in the present embodiment, the identifier 27 does not appear in the upper image P1 that is used for detecting the region of nail T. Thus, it is possible to successively perform image recognition.

On the other hand, the lateral image P2 shown on the left side in FIG. 4 is an image obtained by the photographing unit 5 via the mirror 18, and there appear the lateral surfaces of the finger U that includes the nail T having the nail tip placed on the nail rest 25 and the finger stage 2, and the cutout portion 253 of the nail rest 25 and the identifier 27 provided on the wall surface 252 of the cutout portion 253. Thus, it is possible to accurately detect the upper end position of the nail rest 25 and the relationship between the upper end position and the height position of the nail T from the nail image (lateral image P2).

The reference line h1 shown in the lateral image P2 in FIG. 4 is the line indicating the height position of the upper end of the nail rest 25 and the upper end position of the identifier 27. The reference line h2 is the line indicating the height position of the highest portion of nail T (most bulging portion in a case where the belly is bulging). The reference line h3 is the line indicating the upper limit of the height position of the nail T, and set to be higher than the reference line h1 by approximately 3 mm, for example.

The reference lines h1 to h3 are virtual lines that are appropriately generated by an application program of the terminal device 7, and synthesized (superimposed) on the display screen of the display 72 (in the present embodiment, lateral image in the nail image display screen 72a shown in FIG. 4). Displaying the reference lines h1 to h3 is not essential. The reference lines h1 to h3 may be virtually used only in the recognition processing in the device, without being displayed on the display screen.

When the height position of nail T exceeds the reference line h3, the user is notified that the height position of nail T is not appropriate, by the display 72 being caused to display an error message indicating that printing is not possible or the like or by notification with light by a lamp or a light, or with sound of a speaker, a buzzer or the like as a notifier. When the height position of nail T is lower than the reference line h1, it is considered that the nail T is not placed on the nail rest 25 correctly. Thus, also in this case, the user is notified that the height position of nail T is not appropriate, by the display 72 being caused to display an error display or by notification with light by a lamp or a light, or with sound of a speaker, a buzzer or the like. That is, the display 72 functions as a notifier.

When the height position of nail T is not appropriate, the display 72 may be caused to further display a message or the like urging the user to adjust the position of nail T, such as "Lower nail height." and "Place nail tip on nail rest.".

It is not essential to display the error message or the like or display the message urging the user to adjust the position of nail T when the position of nail T is not appropriate. For example, when the user confirms the nail image display screen 72a of the display 72 and determines that the position of nail T is not appropriate, the user may correct the position by himself/herself.

The reference line h2 indicating the highest portion of the nail T is proper when the reference line h2 is between the reference line h1 and the reference line h3 (range indicated by "α (proper range)" in FIG. 4). The printing becomes possible when the height position of nail T is detected within this range. In this case, as a notifier, the display 72 may be caused to display a message indicating that the nail position is appropriate, or the user may be notified with light by a lamp or a light, or notified by a sound of a speaker or a buzzer.

When the nail T is arranged at an appropriate position and the nail region is detected to specify the region to perform printing, printing data for printing a nail design is generated in the range and output to a printing unit of the printing device 1. Thus, a desired nail design is printed on the surface of nail T.

It is possible to safely perform nail printing with a high accuracy by arranging the nail T at the correct height position.

As described above, according to the present embodiment, the printing device 1 includes: a finger stage 2 that holds the finger U corresponding to the nail T which is a printing target; and a photographing unit 5 that obtains images of nail T of the finger U held by the finger stage 2.

The finger stage 2 includes a nail rest 25 on which the tip of the nail T is placed. The photographing unit 5 can obtain the image (lateral image P2) from the lateral direction of nail T placed on the nail rest 25. The identifier 27 of the position of nail T is provided on the lateral surface side of the nail rest 25.

By such a configuration, it is possible to easily confirm the position of nail T by using the lateral image P2, and accurately determine whether the arrangement of nail T is appropriate or not.

In the present embodiment, the identifier 27 that can be distinguished from the nail T and the components of the finger stage 2 is provided at such a position that the identifier 27 does not appear in the upper image P1 of nail T but appears in the lateral image P2.

Thus, in the upper image P1 of nail T that is used for detecting the region of nail T (outline of nail T), the finger stage 2 that is formed in a color (black or the like) having a good contrast with respect to the nail T and the finger U appears, but the identifier 27 that is formed in a different color (for example, red or pale blue) does not appear. Thus, the detection of region of nail T (outline of nail T) is not interfered with by the identifier 27, and it is possible to accurately recognize both of the position in the height direction of nail T and the outline shape of nail T.

As a result, it is possible to perform nail printing with a high accuracy in the appropriate region of the nail T.

In addition, in the present embodiment, a mirror 18 made of a synthetic resin is provided as an optical element.

Thus, it is possible to obtain the configuration relatively inexpensively. Since the mirror 18 is made of a synthetic resin, it is possible to easily process the mirror 18 according to the shape or the like of the location to arrange the mirror 18. Furthermore, since the mirror 18 is light compared to a mirror made of glass, it is possible to easily fix the mirror 18 to the inclined surface 171 or the like. Moreover, since the mirror made of synthetic resign is not easily broken compared to the mirror made of glass, it is possible to avoid damage when a strong impact was applied to the printing device 1 or the like, and thus safety is improved.

Though the embodiment of the present disclosure has been described above, the present disclosure is not limited to the embodiment, and various modifications can be made within the scope of the disclosure.

For example, in the present embodiment, the printing device 1 includes a single photographing unit 5 as a photographing unit. By arranging the mirror 18 as an optical element, the photographing unit 5 can obtain the lateral image capturing the nail T from the lateral side via the mirror 18. However, the configuration of photographing unit 5 is not limited to the above example.

For example, there may be provided multiple photographing units (photographing units 5) in the printing device 1. In this case, there are provided, as the photographing units, a first photographing unit that obtains an image (upper image P1) from the upper direction of nail T placed on the nail rest 25 and a second photographing unit that obtains an image (lateral image P2) from the lateral direction of nail T placed on the nail rest 25.

In this case, the first photographing unit that obtains the upper image P1 of nail T is provided on the inner side of top surface of the housing 11 or the like, and the second photographing unit that obtains the lateral image P2 of nail T is arranged lateral on the side where the cutout portion 253 is provided in the nail rest 25, such as the position where the mirror 18 is arranged in the above embodiment, for example.

The number of each of the first photographing unit and the second photographing unit is not limited to one, and there may be multiple first photographing units and multiple second photographing units.

In a case where the first photographing unit that obtains the upper image P1 and the second photographing unit that obtains the lateral image P2 are provided, it is not necessary to provide an optical element such as the mirror 18. Thus, it is not necessary to adjust the angle and position of the optical element such as the mirror 18 so as to locate the lateral surface of the nail T within the photographing possible range of the photographing unit (photographing unit 5), and it is possible to omit the trouble of assembly. By providing the multiple photographing units in such a sway to obtain the upper image P1 and the lateral image P2, it is possible to obtain both of the upper image P1 and the lateral image P2 without using the optical element such as the mirror 18. Thus, the distortion of image caused by the intervention of optical element is not generated, which enables obtaining a clearer nail image (especially, a clearer lateral image P2).

The position to arrange the second photographing unit that obtains the lateral image P2 is not particularly limited as long as the second photographing unit can obtain the lateral image P2.

The second photographing unit needs to be arranged at the position that does not interfere with the movement of print head of the printing unit. There is a concern that ink (ink mist or the like) splattering from the printing unit attaches to the lens and the like in a case where the photographing unit is arranged lateral to the finger stage 2 different from a case where the photographing unit (photographing unit 5) is arranged on the upper side of the printing unit. Thus, a visor, a shutter or the like that protects the photographing unit (photographing unit 5), especially the lens portion, from the ink mist or the like may be provided.

The mirror shape as the optical element is not limited to the shape shown in the embodiment.

Figure 5:
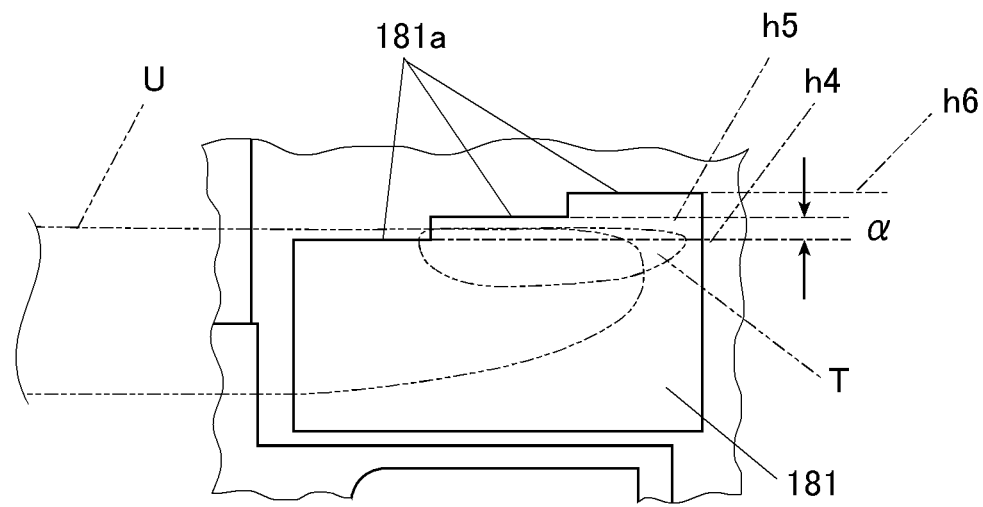
FIG. 5 is a plan view showing a modification example of a mirror that is provided in the printing device.

For example, as shown in FIG. 5, the mirror may be a deformed mirror 181 that has, in the upper section, step portions 181a that are multiple steps in the height direction.

In the example shown in FIG. 5, the mirror 181 has three step portions 181a gradually becoming higher toward the nail tip side from the root side of the finger U.

In FIG. 5, reference lines h4 to h6 are assumed. The reference line h4 indicates the height position of the lowest step portion 181a. The reference line h6 indicates the height position of the highest step portion 181a. The reference line h5 indicates the height position of the intermediate step portion 181a between the lowest and highest step portions 181a. When the highest portion of the nail T is located between the reference line h4 and the reference line h5 (range indicated by "α (proper range)" in FIG. 5), the position is appropriate. When the highest portion of nail T is lower or higher than this range, the user is urged to adjust the position of nail T. The reference line h6 indicates the upper limit position that allows the entire nail T and finger U to appear in the mirror.

When the mirror is a deformed mirror, the specific shape is not limited to the example shown in FIG. 5.

Similarly to the reference lines h1 to h3 described in the above embodiment, the reference lines h4 to h6 are virtual lines that are appropriately generated by an application program of the terminal device 7, and synthesized and displayed on the display screen of the display 72 (in the present embodiment, lateral image in the nail image display screen 72a). The reference lines h4 to h6 may be virtually used only in the recognition processing in the device, without being displayed on the display screen.

In such a way, by deforming the shape of the mirror 181, it is possible to easily detect the height position of nail T from the lateral image P2. In a case where the mirror 181 is made to have a deformed shape, by making the mirror 181 with a synthetic resign such as acrylic, it is possible to easily form a complicated shape compared to a case of making the mirror 181 with glass.

Figure 6:
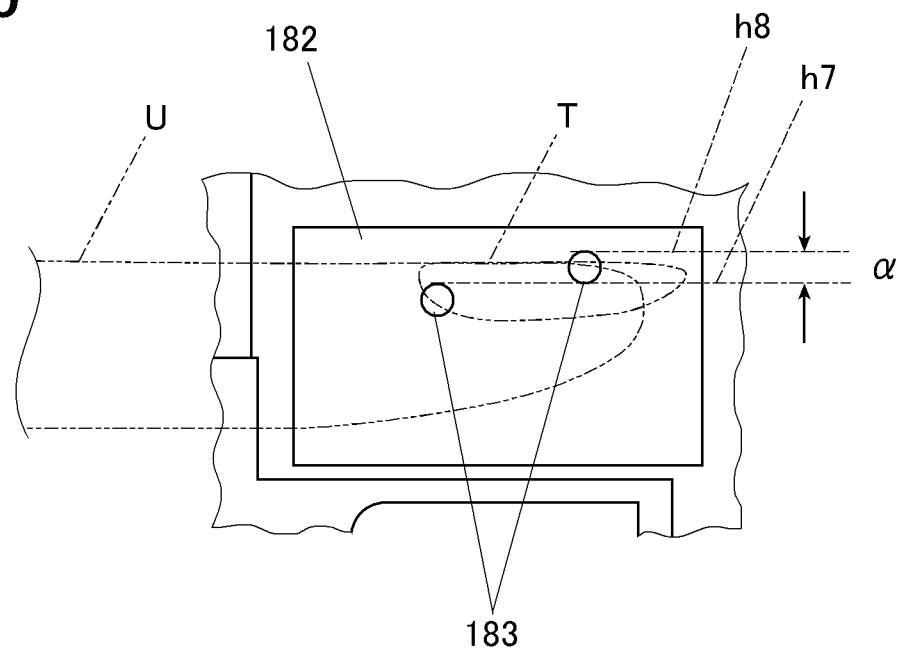
FIG. 6 is a plan view showing a modification example of a mirror that is provided in the printing device.

Furthermore, as shown in FIG. 6, marks (hereinafter, referred to as "reference marks 183") each indicating a reference of the height position of nail T may be provided in the mirror 182. The manner and arrangement of providing the reference marks 183 are not particularly limited. For example, FIG. 6 illustrates a case where reference marks 183 that are two circular holes are provided to penetrate the mirror 182.

In a case where a reference line h7 touching the upper end of the lower circular hole and the reference line h8 touching the upper end of the upper circular hole are assumed, when the highest portion of the nail T is located between the reference line h7 and the reference line h8 (range indicated by "α (proper range)" in FIG. 6), the position is appropriate. When the highest portion of nail T is lower or higher than this range, the user is urged to adjust the position of nail T.

Similarly to the reference lines h1 to h3 described in the above embodiment and the above reference lines h4 to h6, the reference lines h7 and h8 are virtual lines that are appropriately generated by an application program of the terminal device 7, and synthesized and displayed on the display screen of the display 72 (in the present embodiment, lateral image in the nail image display screen 72a). The reference lines h7 and h8 may be virtually used only in the recognition processing in the device, without being displayed on the display screen.

In such a way, by providing the reference marks 183 to the mirror 182, it is possible to easily detect the height position of nail T from the lateral image P2. In a case where the mirror 182 is provided with the reference marks 183 in such a way, by making the mirror 182 with a synthetic resign such as acrylic, it is possible to easily form a complicated shape compared to a case of making the mirror 182 with glass.

The number and shape of the reference marks 183 is not particularly limited.

For example, the reference marks 183 may be slits formed at positions corresponding to the respective reference lines h7 and h8. The reference marks 183 may be a single circular hole or the like of such a size that the lower end is at the height position of the reference line h7 and the upper end is at the height position of the reference line h8.

The reference marks as shown in FIG. 6 may be provided to the deformed mirror as shown in FIG. 5. This configuration further makes it easy to grasp the reference of height position of nail T.

Though not shown in FIGS. 5 and 6, in each of the images reflected in the mirrors 181 and 182, the identifier 27 provided to the nail rest 25 appears together with the nail T, similarly to the mirror 18 described in the embodiment.

By combining the identifier 27 with the deformed mirror 181 or the mirror 182 provided with the reference marks 183, the reference of height position of the nail T becomes easy to grasp, and it is possible to perform detection more accurately.

The above embodiment takes, as an example, a case where the identifier 27 is formed by painting the entire wall surface 252 red, pale blue or the like. However, the configuration is not limited to a case where the identifier 27 is provided over the entire wall surface 252.

The identifier 27 may be any identifier as long as the identifier makes it easy to detect the position of upper end of the nail rest 25 when image processing or the like is performed to the lateral image P2. Thus, for example, the identifier 27 may be a line of red color or the like painted on the upper end portion in the wall surface 252, or may be a circular mark of red color or the like drawn on the upper end portion in the wall surface 252.

The above embodiment takes, as an example, the configuration of providing the mirror 18 as the optical element. However, the optical element is not limited to the mirror as long as the optical element is able to locate the lateral surface of the nail T of the finger U held by the finger stage 2 within the photographing possible range of the photographing unit 5.

For example, a prism or the like may be arranged as the optical element. Also in this case, the arrangement, angle and the like are adjusted such that the lateral surface of nail T is located within the photographing possible range of the photographing unit 5.

The above embodiment takes, as an example, a case where the upper image P1 and the lateral image P2 are displayed side by side in a single screen as the nail image display screen 72a as illustrated in FIG. 4. However, displaying in the nail image display screen 72a is not limited to this.

For example, one of the upper image P1 and the lateral image P2 may be displayed in a single screen as the nail image display screen 72a, and the images may be switched appropriately.

The above embodiment takes, as an example, a case where the display 72 to display the nail image display screen 72a or the like is provided in the terminal device 7. However, the configuration is not limited to the case of providing the display 72 in the terminal device 7.

For example, a display may be provided to the upper surface of housing 11 of the printing device 1 to display the nail image display screen 72a on the display.

It is not essential to display the upper image P1 and the lateral image P2 as the nail image display screen 72a. The upper image P1 and the lateral image P2 may be used only in image processing when recognition of the nail T (recognition of the region of nail T, height position of nail T, and the like) is performed in the device, and the upper image P1 and the lateral image P2 may not be displayed.

The above embodiment takes, as an example, a case where each process of nail printing is performed in cooperation between the printing device 1 and the terminal device 7. However, it is not essential that the printing device 1 cooperates with the terminal device 7. The printing device 1 alone may perform various types of processes.

Although several embodiments of the present disclosure have been described, the scope of the present disclosure is not limited to the above described embodiments and includes the scope of the present disclosure that is described in the claims and the equivalents thereof.

What is claimed is:

1. A printing device comprising:
   a finger stage on which a finger of a user is placed;
   a camera which is provided separate in a vertical direction from a printing target surface of a nail in the finger placed on the finger stage; and
   an optical element which is provided separate in a horizontal direction from the printing target surface of the nail in the finger placed on the finger stage, wherein
   the camera obtains a first image capturing the printing target surface of the nail from the vertical direction and a second image capturing the printing target surface of the nail from the horizontal direction,
   the camera obtains the second image by capturing the printing target surface of the nail via the optical element, and
   the optical element includes a mark for detecting a position in the vertical direction of the nail based on the second image.

2. The printing device according to claim 1, wherein the optical element includes an edge region formed in a stair shape as the mark.

3. The printing device according to claim 1, wherein the optical element is a mirror, and
   the mirror includes a perforation as the mark.

4. The printing device according to claim 1, further comprising a display, wherein the display displays, in a superimposed manner, the second image and a reference line indicating a reference of the position in the vertical direction of the nail.

5. The printing device according to claim 4, wherein the display displays that printing is possible in response to the position in the vertical direction of the nail being within a proper range, and displays that printing is not possible in response to the position in the vertical direction of the nail being out of the proper range.

6. The printing device according to claim 1, further comprising a light or a speaker, wherein the light or the speaker notifies that printing is possible in response to the position in the vertical direction of the nail being within a proper range, and notifies that printing is not possible in response to the position in the vertical direction of the nail being out of the proper range.

* * * * *